(12) United States Patent
Weller et al.

(10) Patent No.: US 8,021,771 B2
(45) Date of Patent: Sep. 20, 2011

(54) COMPOSITE HEAT ASSISTED MAGNETIC RECORDING MEDIA WITH TEMPERATURE TUNED INTERGRANULAR EXCHANGE

(75) Inventors: Dieter Klaus Weller, San Jose, CA (US); Edward Charles Gage, Lakeville, MN (US); Ganping Ju, Sewickley, PA (US); Bin Lu, San Ramon, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 12/684,380

(22) Filed: Jan. 8, 2010

(65) Prior Publication Data

US 2010/0110577 A1    May 6, 2010

Related U.S. Application Data

(62) Division of application No. 11/336,799, filed on Jan. 20, 2006, now Pat. No. 7,678,476.

(51) Int. Cl.
*G11B 5/65* (2006.01)

(52) U.S. Cl. ............ 428/836; 428/822; 428/822.1; 428/836.2; 428/836.3; 428/323; 428/402; 428/692.1; 360/131

(58) Field of Classification Search ............ None
See application file for complete search history.

(56) References Cited

U.S. PATENT DOCUMENTS

| | | | |
|---|---|---|---|
| 5,208,797 A | 5/1993 | Nakaki et al. | |
| 5,373,238 A * | 12/1994 | McGuire et al. | 324/252 |
| 5,481,508 A | 1/1996 | Watanabe et al. | |
| 5,508,982 A | 4/1996 | Challener, IV | |
| 5,528,565 A | 6/1996 | Watanabe et al. | |
| 5,599,619 A | 2/1997 | Eckhardt et al. | |
| 5,612,131 A | 3/1997 | Bojarczuk, Jr. et al. | |
| 5,639,567 A | 6/1997 | Challener, IV | |
| 5,793,711 A | 8/1998 | Bojarczuk, Jr. et al. | |
| 6,011,664 A | 1/2000 | Kryder et al. | |
| 6,017,619 A | 1/2000 | Shin et al. | |
| 6,174,597 B1 * | 1/2001 | Yusu et al. | 428/332 |
| 6,200,673 B1 | 3/2001 | Miyamoto et al. | |
| 6,387,530 B1 * | 5/2002 | Liu et al. | 428/559 |
| 6,388,956 B1 | 5/2002 | Mori et al. | |
| 6,424,601 B1 | 7/2002 | Oonuki et al. | |
| 6,468,670 B1 | 10/2002 | Ikeda et al. | |
| 6,472,047 B1 * | 10/2002 | Kirino et al. | 428/141 |
| 6,534,203 B2 | 3/2003 | Iwasaki et al. | |
| 6,534,204 B1 | 3/2003 | Akimoto et al. | |
| 6,534,205 B2 | 3/2003 | Sato et al. | |
| 6,545,955 B1 | 4/2003 | Iwata et al. | |
| 6,551,728 B1 | 4/2003 | Acharya et al. | |
| 6,602,621 B2 | 8/2003 | Matsunuma et al. | |

(Continued)

FOREIGN PATENT DOCUMENTS

JP    200385702    3/2003

*Primary Examiner* — Kevin M Bernatz

(74) *Attorney, Agent, or Firm* — Robert P. Lenart, Esq.; Pietragallo Gordon Alfano Bosick & Raspanti, LLP

(57) ABSTRACT

A thin film structure including a plurality of grains of a first magnetic material having a first Curie temperature embedded in a matrix of a second material having a second Curie temperature, wherein the second Curie temperature is lower than the first Curie temperature and the second material comprises one or more of an oxide, a sulfide, a nitride, and a boride.

14 Claims, 8 Drawing Sheets

U.S. PATENT DOCUMENTS

| | | |
|---|---|---|
| 6,671,234 B1 | 12/2003 | Hirokane et al. |
| 6,707,766 B2 | 3/2004 | Mori et al. |
| 6,754,020 B1 * | 6/2004 | Hikosaka et al. ............... 360/59 |
| 6,777,112 B1 | 8/2004 | Girt et al. |
| 6,815,098 B2 | 11/2004 | Matsunuma et al. |
| 6,830,824 B2 | 12/2004 | Kikitsu et al. |
| 6,834,026 B2 | 12/2004 | Fullerton et al. |
| 6,881,497 B2 | 4/2005 | Coffey et al. |
| 6,916,556 B2 | 7/2005 | Lee |
| 7,060,375 B2 | 6/2006 | Lee et al. |
| 2001/0036563 A1 * | 11/2001 | Watanabe et al. .......... 428/694 T |
| 2001/0051287 A1 | 12/2001 | Kikitsu et al. |
| 2002/0188052 A1 * | 12/2002 | Yadav et al. ................... 524/435 |
| 2002/0191320 A1 | 12/2002 | Coffey et al. |
| 2003/0108721 A1 | 6/2003 | Fullerton et al. |
| 2003/0143433 A1 | 7/2003 | Yoshida et al. |
| 2004/0166371 A1 | 8/2004 | Berger et al. |
| 2004/0196593 A1 * | 10/2004 | Yasui et al. .................... 360/135 |
| 2004/0247941 A1 * | 12/2004 | Chen et al. ................. 428/694 T |
| 2005/0048325 A1 | 3/2005 | Ajan |
| 2005/0106422 A1 | 5/2005 | Lu et al. |
| 2005/0135010 A1 * | 6/2005 | Liu et al. ....................... 360/135 |
| 2005/0142387 A1 | 6/2005 | Araki et al. |

* cited by examiner

COMPOSITE HEAT ASSISTED MAGNETIC RECORDING MEDIA WITH TEMPERATURE TUNED INTERGRANULAR EXCHANGE

CROSS REFERENCE TO RELATED APPLICATION

This application is a divisional application of U.S. patent application Ser. No. 11/336,799, filed Jan. 20, 2006, and titled "Composite Heat Assisted Magnetic Recording Media With Temperature Tuned Intergranular Exchange", now U.S. Pat. No. 7,678,476, which is hereby incorporated by reference.

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

BACKGROUND

This invention relates to thin film devices, and more particularly to magnetic recording films for use in heat assisted magnetic recording.

As the grain size of magnetic recording media is decreased in order to increase the areal density, a threshold known as the superparamagnetic limit is reached for a given material and temperature. The superparamagnetic limit is a physical constraint, beyond which stable data storage is no longer feasible.

Thermal stability of magnetic recording systems can be improved by employing a recording medium formed of a material with a very high magnetic anisotropy $K_u$. The energy barrier for a uniaxial magnetic grain to switch between two stabilized states is proportional to the product of the magnetic anisotropy $K_u$ of the magnetic material and the volume (V) of the magnetic grains. In order to provide adequate data storage, the product $K_u V$ should be as large as 60 $k_B T$, where $k_B$ is the Boltzman constant and T is the absolute temperature, in order to provide 10 years of thermally stable data storage. Although it is desirable to use magnetic materials with high $K_u$, very few of such hard magnetic materials exist. Furthermore, with currently available magnetic materials, recording heads are not able to provide a sufficient magnetic writing field to write on such materials.

Heat assisted magnetic recording (HAMR) refers to the concept of locally heating a magnetic recording medium to reduce the coercivity of the recording medium so that the applied magnetic writing field can more easily direct the magnetization of the recording medium during the temporary magnetic softening of the recording medium caused by the heat source. Heat assisted magnetic recording (HAMR) systems for writing information on a magnetic medium employ a combination of a magnetic write field gradient and a thermal gradient, which is proposed to extend magnetic recording beyond 1 Terabit per $in^2$. HAMR allows for the use of small grain media, which is desirable for recording at increased areal densities, with a larger magnetic anisotropy at room temperature assuring sufficient thermal stability.

Several key requirements of the HAMR media include high anisotropy, moderate Curie temperature and good microstructure with thermally well-isolated grains. Among the media candidates, it remains a challenge to satisfy all the three requirements simultaneously.

A need therefore exists for recording films that can effectively be used for heat assisted magnetic recording.

SUMMARY

This invention provides a thin film structure comprising a first layer including a first plurality of grains of magnetic material having a first intergranular exchange coupling, and a second layer positioned adjacent to the first layer and including a second plurality of grains of magnetic material having a second intergranular exchange coupling, wherein the second intergranular exchange coupling is larger than the first intergranular exchange coupling and wherein the Curie temperature of the first layer is greater than the Curie temperature of the second layer.

In another aspect, the invention provides a thin film structure comprising a plurality of grains of a first magnetic material having a first Curie temperature embedded in a matrix of a second magnetic material having a second Curie temperature, wherein the second Curie temperature is lower than the first Curie temperature and the second magnetic material comprises one or more of an oxide, a sulfide, a nitride, and a boride.

The invention further encompasses a data storage system comprising a transducer, a storage medium including a first layer including a first plurality of grains of magnetic material having a first intergranular exchange coupling and a second layer positioned adjacent to the first layer and including a second plurality of grains of magnetic material having a second intergranular exchange coupling, wherein the second intergranular exchange coupling is larger than the first intergranular exchange coupling and wherein the Curie temperature of the first layer is greater than the Curie temperature of the second layer, and an actuator for causing relative movement between the transducer and the storage medium.

In another aspect, the invention provides a data storage system comprising a transducer, a storage medium including a plurality of grains of a first magnetic material having a first Curie temperature embedded in a matrix of a second magnetic material having a second Curie temperature, wherein the second Curie temperature is lower than the first Curie temperature and the second magnetic material comprises one or more of an oxide, a sulfide, a nitride, and a boride, and an actuator for causing relative movement between the transducer and the storage medium.

DETAILED DESCRIPTION OF THE INVENTION

Figure 1:
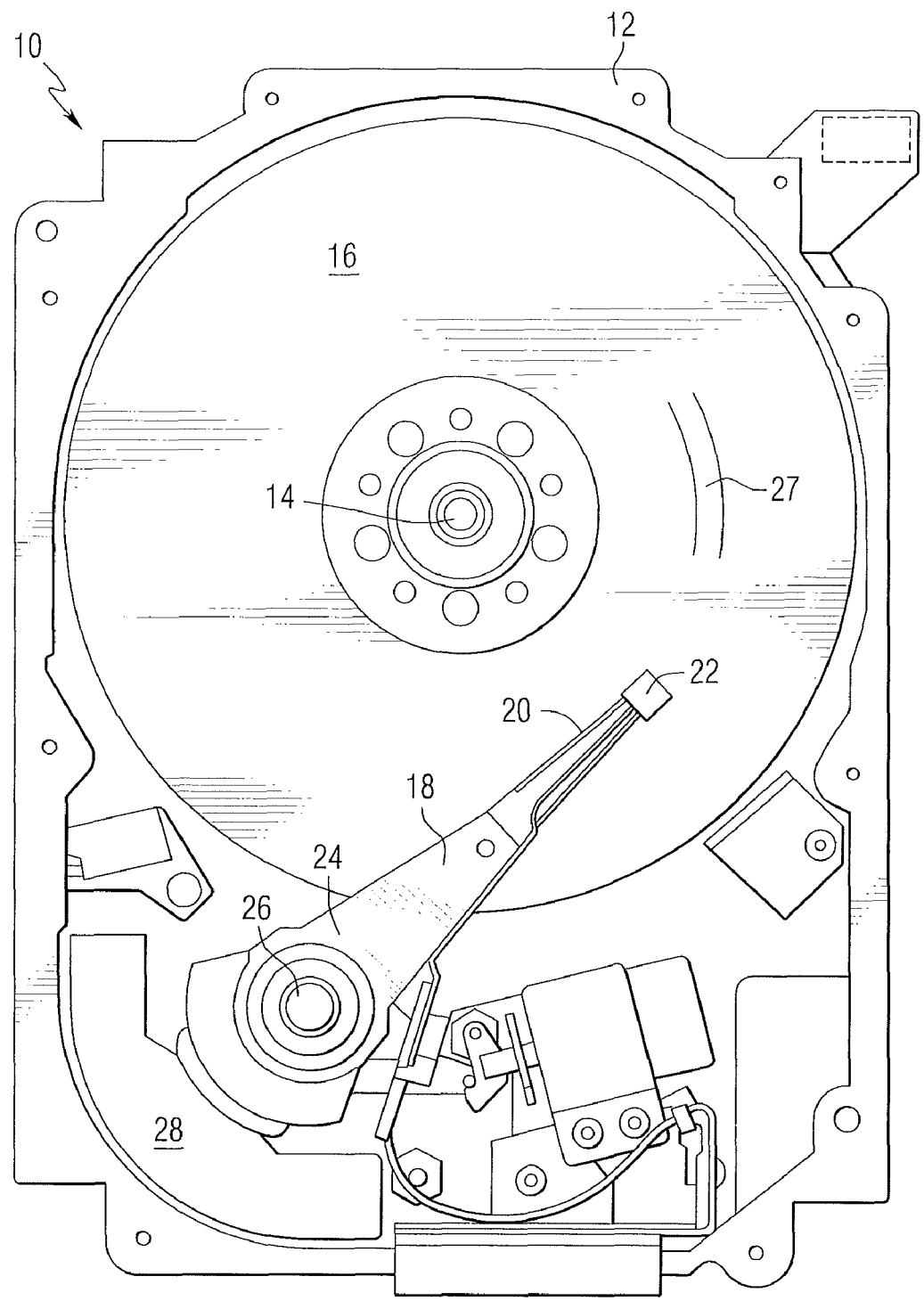
FIG. 1 is a pictorial representation of a disc drive storage system that can include a recording medium having a magnetic recording film in accordance with the invention.

FIG. 1 is a pictorial representation of a data storage device in the form of a disc drive 10 that can utilize a recording medium constructed in accordance with this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16, within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well-known in the art.

For heat assisted magnetic recording (HAMR), an electromagnetic wave of, for example, visible, infrared or ultraviolet light is directed onto a surface of the data storage medium to raise the temperature of a localized area of the medium to facilitate switching of the magnetization of the area. Recent designs of HAMR recording heads include a thin film waveguide on a slider to guide light to the storage medium for localized heating of the storage medium. To launch light into the waveguide, a grating coupler can be used.

Figure 2:
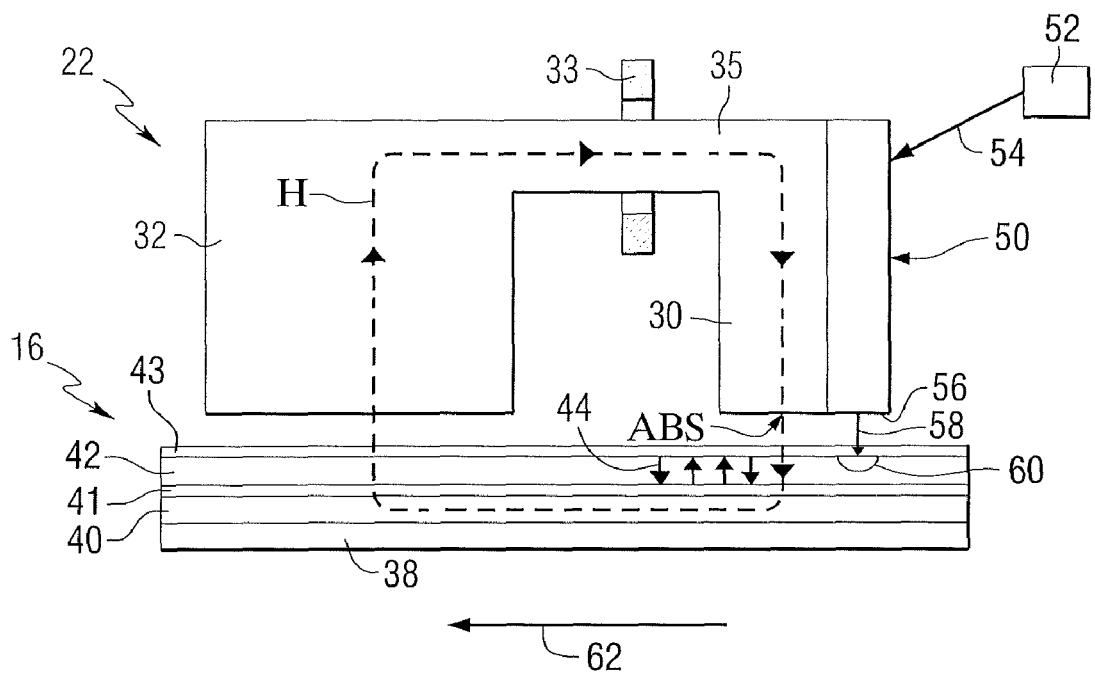
FIG. 2 is a schematic illustration of a heat assisted magnetic recording head and recording medium including a magnetic recording film in accordance with the invention.

FIG. 2 is a schematic side view of a HAMR recording head 22 and a magnetic recording medium 16. Although an embodiment of the invention is described herein with reference to recording head 22 as a perpendicular magnetic recording head and the medium 16 as a perpendicular magnetic recording medium, it will be appreciated that aspects of the invention may also be used in conjunction with other types of recording heads and/or recording mediums where it may be desirable to employ heat assisted recording. Specifically, the head 22 may include a writer section comprising a main write pole 30 and a return or opposing pole 32 that are magnetically coupled by a yoke or pedestal 35. It will be appreciated that the head 22 may be constructed with a write pole 30 only and no return pole 32 or yoke 35. A magnetization coil 33 may surround the yoke or pedestal 35 for energizing the head 22. The HAMR head 22 may also include a read portion, not shown, which may be any conventional type read head as is generally known in the art. The recording medium 16 is positioned adjacent to or under the recording head 22. Relative movement between the head and the medium is indicated by arrow 62.

As illustrated in FIG. 2, the recording head 22 also includes a structure for heating the magnetic recording medium 16 proximate to where the write pole 30 applies the magnetic write field H to the recording medium 16. The medium 16 includes a substrate 38, a heat sink layer 40, a seed layer 41, a magnetic recording layer 42, and a protective layer 43. A magnetic field H produced by current in the coil 33 is used to control the direction of magnetization of bits 44 in the recording layer of the medium.

The structure for heating the medium may include, for example, a planar optical waveguide schematically represented by reference number 50. The waveguide 50 conducts energy from a source 52 of electromagnetic radiation, which may be for example, ultraviolet, infrared, or visible light. The source 52 may be, for example, a laser diode, or other suitable laser light source for directing a light beam 54 toward the waveguide 50. Various techniques that are known for coupling light beam 54 into the waveguide 50 may be used. For example, the light source 52 may work in association with an optical fiber and external optics for collimating the light beam 54 from the optical fiber toward a diffraction grating on the waveguide. Alternatively, a laser may be mounted on the waveguide 50 and the light beam 54 may be directly coupled into the waveguide 50 without the need for external optical configurations. Once the light beam 54 is coupled into the waveguide 50, the light propagates through the waveguide 50 toward a truncated end 56 of the waveguide 50 that is formed adjacent the air-bearing surface (ABS) of the recording head 22. Light 58 exits the end of the waveguide and heats a portion 60 of the medium, as the medium moves relative to the recording head as shown by arrow 62.

While FIG. 1 shows a disc drive, the invention can be applied to other storage devices that include a transducer, a storage medium, and an actuator for causing relative movement between the transducer and the storage medium.

Figure 3:
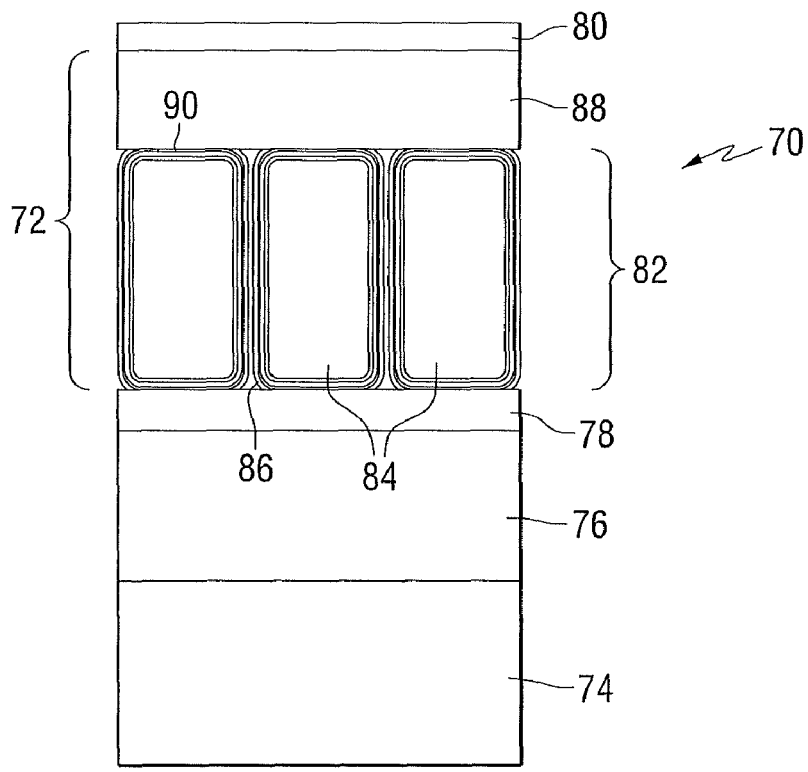
FIG. 3 is a schematic sectional view of a recording medium including a magnetic recording film in accordance with the invention.

As shown in FIG. 3, the heat assisted magnetic recording medium 70 includes a composite thin film magnetic recording layer 72 constructed in accordance with one embodiment of the present invention. The recording medium 70 in this example includes a substrate 74, a heat sink layer 76 that may serve as a soft magnetic underlayer, and a seed layer 78 on the heat sink layer.

The substrate 74 may be made of any suitable material such as ceramic glass, amorphous glass, aluminum or NiP coated AlMg. The heat sink layer has a typical thickness of from about 10 to about 1,000 nm, and may be made of any suitable material such as Cu, Ag, Al, Au, CuZr, CoFe, FeCoB, FeAlN, FeAlSi, NiFe, CoZrNb or FeTaN. The heat sink layer 76 may also comprise a plurality of laminated layers. A protective and/or lubricating layer 80 can be provided on the recording layer.

The composite thin film magnetic recording layer includes a first (or bottom) layer 82, which in this example is a granular layer having magnetic grains 84, that are separated by a decoupling material 86, which can be an oxide. The composite magnetic recording film further includes a second (or top) layer 88 that is a substantially continuous layer having magnetic grains that are larger than the grains of the first layer. Layer 82 can have a thickness in the range of 2 to 30 nm, and layer 88 can have a thickness in the range of 0.5 to 30 nm.

An optional exchange coupling control layer 90 may be provided between the first and second layers to allow tuning of the interlayer exchange. The thickness of the optional exchange coupling control layer 90 can be changed to control the amount of exchange coupling between the first and second layers. The exchange coupling control layer can have a thickness of 0 to 5 nm, and can be Pt, Ir, Rh, Pd or Ru.

The seed layer can have a thickness of from about 1 to about 50 nm and may be used to control properties such as orientation and grain size of the subsequently deposited layers. For example, the seed layer may be a face centered cubic material such as Pt which controls the orientation of layer 82, or a material such as Ru or Rh which controls grain size and facilitates epitaxial growth of the subsequently deposited layers, or a combination thereof. The seed layer may be made of one or more layers of material such as CoCr, CoCrRu, Ru, Pt, Pd, Rh, Ta, TiC, indium tin oxide (ITO), AlN, ZnO or another metal oxide. The protective layer 80 may be made of any suitable material such as diamond-like carbon.

This invention provides a composite HAMR media with a thin film recording layer including layers of magnetic material having different Curie temperatures and different intergranular exchange coupling.

The recording layer in the media includes at least two different functional (magnetic) components. The magnetic component of layers 82 and 88 can be, for example, $Co_3Pt$, CoXPt alloy, CoX/Pt multilayer, CoXPd alloy, CoX/Pd multilayer, FePt, FeXPt alloy, or TbFeCo. Since the Curie temperatures are material dependent, the layers can have different Curie temperatures by using different compositions. Grain sizes can be between 1 and 10 nm in the bottom layer, and between 1 and 1000 nm in the top layer. These grain sizes are in-plane dimensions that are approximately the diameter of the grains, although the grains are not truly circular.

In the bilayer example of FIG. 3, the bottom layer has high anisotropy and smaller grains, and is thermally unstable by itself at storage temperatures (or room temperature (RT)), while the top layer has grains with comparable (or smaller) anisotropy but much larger intergranular exchange coupling. Intergranular exchange coupling is the magnetic energy resulting from the magnetic interaction of the granular magnetic material. In this case the grains are in a plane and through the plane thickness. Since this is a very short range interaction, the interaction energy is determined by properties of the layer's microstructure and specifically the grain boundaries.

At recording temperature, the top layer is heated to a temperature above the Curie temperature and is non-magnetic. Hence coupling between grains of the bottom layer (through the top layer) is smaller at recording temperature than at storage temperatures. However, at storage temperatures the thermal stability of the bilayer media is enhanced due to increased intergranular exchange coupling between grains of the bottom layer, through the top layer.

Figure 4:
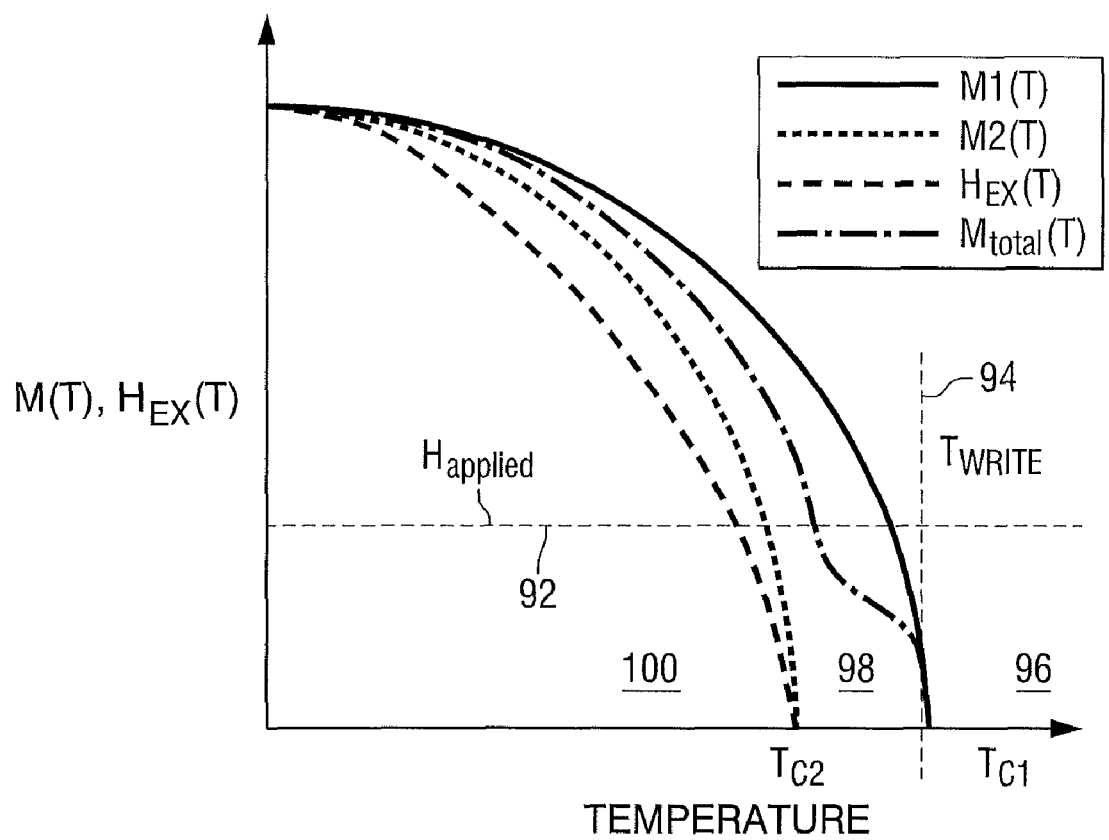
FIG. 4 is a graph of magnetic field and magnetization versus temperature.

FIG. 4 is a graph of magnetic field H and magnetization M versus temperature. In FIG. 4, M(1) is the magnetization of the top layer 88, M(2) is the magnetization of the bottom layer 82, $M_{total}(T)$ is the magnetization of the composite recording layer 72, and $H_{EX}(T)$ is the applied magnetic field. Line 92 shows the applied magnetic field $H_{applied}$. Line 94 shows the write temperature $T_{write}$. $T_{C1}$ is the Curie temperature of the bottom layer and $T_{C2}$ is the Curie temperature of the top layer.

Figure 5:
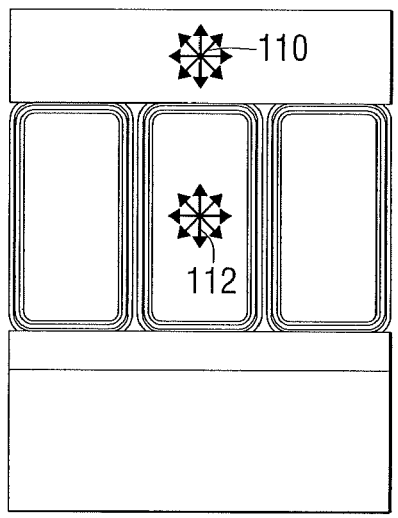
FIGS. 5, 6 and 7 are schematic sectional views of a recording medium including a magnetic recording film in accordance with the invention.

For temperatures in the region indicated by number 96 of FIG. 4, where the temperature exceeds the Curie temperature of both magnetic species, the magnetic materials are paramagnetic. FIG. 5 shows that when the temperature of the layers exceeds the Curie temperature of both layers, the magnetization 110 in the top layer and the magnetization 112 of the bottom layer are not aligned in any particular direction.

As the media cools (in the region indicated by number 98 of FIG. 4), the bottom layer cools to below its Curie temperature and its magnetization aligns with the applied field. At this point, FIG. 6 shows that the magnetization 110 in the top layer is not aligned in any particular direction, but the magnetization 114, 116 and 118 of the bottom layer is aligned with the applied field.

In the region indicated by number 98 of FIG. 4, the top layer is still above its Curie temperature and is therefore paramagnetic. The bottom layer is aligned with the applied field and is experiencing freezing (that is, the direction of magnetization is becoming fixed) as the media cools, given the small grain size and elevated temperature. The media is designed so that the decay time for the magnetic properties due to their thermal instability is long compared with the cooling time of, for example, ~1 ns. This minimizes the thermal decay which would reduce the resulting magnetization and ultimately the signal to noise ratio. Decay time is usually used in conjunction with reduction of magnetization due to thermally activated switching of some of the media grains (for example, "thermal decay" due to the superparamagnetic effect). The cooling time, by contrast, is the time it takes for the medium to cool down to operating (storage) temperature after heating.

Figure 6:
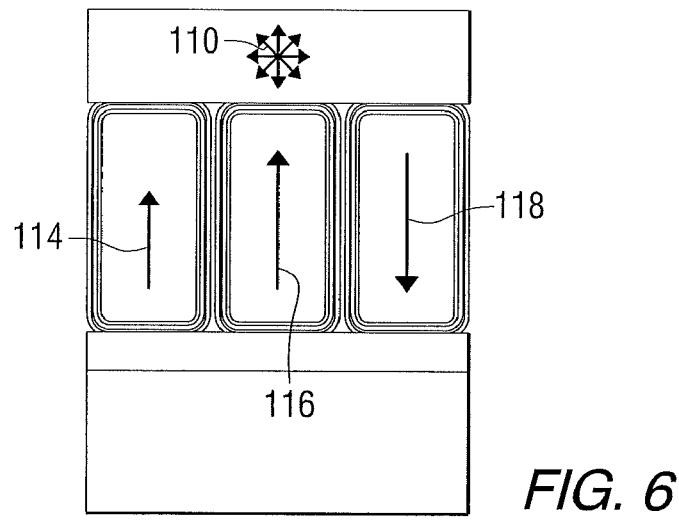

FIG. 6 illustrates a transition between the grains indicating that a reversal in the applied field has occurred. More particularly, the frozen magnetization in FIG. 6 indicates that there was a transition during recording. The last grain's magnetization 114 is still small since it is closer to the light source and therefore at a higher temperature.

Figure 7:
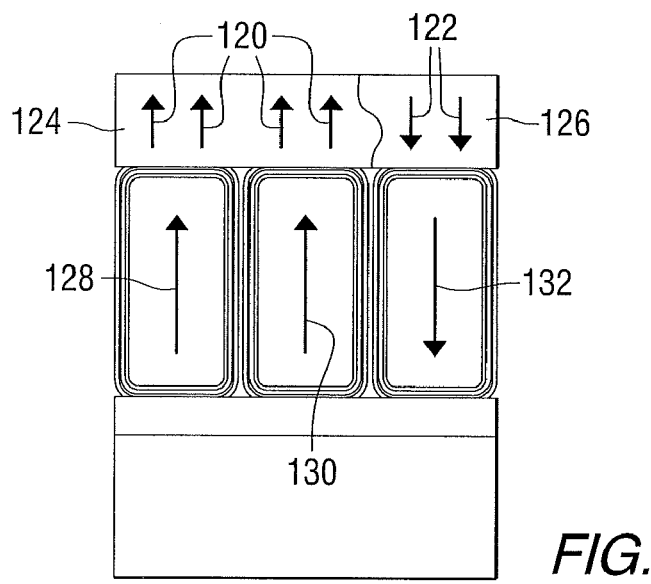

In the region indicated by number 100 of FIG. 4, both layers have cooled to room temperature. Although the bottom layer alone is superparamagnetic (that is, its thermal stability is less than 10 years, and KuV/kT<50) exchange with the top layer prevents thermal decay. This is illustrated in FIG. 7, where the magnetization 120 and 122 in grains 124 and 126 of the top layer and the magnetization 128, 130 and 132 of the grains of the bottom layer are aligned with the applied field.

The effective volume (the combined magnetic volume of the bottom and top layers) is increased via enhanced exchange coupling through the top layer. Thus, $K_uV_{eff}$ is enhanced due to the exchange coupling. The domain walls in the top layer are pinned by the underlying granular structure in the bottom layer. The increased effective volume enhances the thermal stability at storage temperatures. In addition, readback jitter is decreased due to decreased exchange during the writing process. Intergranular exchange causes large jitter because of large cross-track correlation length in perpendicular recording. At elevated temperatures in the present invention, the grains of the bottom layers act independently but at room temperature they act collectively. The exchange here is the effective intergranular exchange, which has two pieces for the bottom layer—grain to grain and grain to top layer back to grain in the bottom layer. The latter is turned off or largely reduced at elevated temperatures.

During heat assisted magnetic recording, the exchange coupling can be tuned (turned off or reduced) by temperature so that high linear density information can be recorded. During the cooling process, the recorded information is copied to the top layer, and thermal stability of the bottom layer is enhanced through enhanced coupling through the top layer.

HAMR produces large temperature gradients, enabling the design of media with a different temperature response. HAMR overcomes the write field limit and enables media to be used irrespective of its magnetic anisotropy, resulting in up to 10x density scaling gain (assuming FePt with 2.5 nm diameter and 10 nm tall grains). The combination of thermal and field gradients results in 2-5x larger gradients during recording compared to perpendicular magnetic recording (PMR), enabling sharper bit-edges and therefore higher linear density. Sharper gradients during writing enable media with higher intergranular exchange to be used, which could alleviate the microstructural requirements, such as the grain size and their magnetic isolation. Because of the detrimental effects of exchange in perpendicular recording (large cross track correlation length inducing jitter), PMR requires magnetically decoupled grains. HAMR has larger effective field gradients and exchange can be reduced at writing temperatures. Hence the strict requirement for isolated grains may not be required for the HAMR microstructure. HAMR enables entirely new media designs with functional layers that can be controlled via temperature (composite designs, e.g. different functional layers can be used for writing and storing).

While recording at elevated temperature, the top layer is nonmagnetic; hence the media resembles a conventional granular oxide media. After cooling, the top layer becomes magnetic and forms a magnetically exchange coupled bit cell. The domain wall, which is frozen during heat assisted recording, is assumed to be stable. The relevant volume for thermal stability corresponds to that of the bit and not that of an individual grain. The magnetic metal can be a conventional, relatively low anisotropy material. Media of this invention can be fabricated as a dual layer using a Co/Pt multilayer structure with different amounts of segregates in the top and bottom layers and two different Curie temperatures. The segregates can be oxides such as $SiO_2$, $TiO_2$, $Ta_2O_5$, $Nb_2O_5$, $WO_5$, NiO, etc.

This invention provides a composite bilayer media with layers having different Curie temperatures and different intergranular exchange coupling. The bottom layer has high anisotropy and smaller grains, and is thermally unstable by itself, while the top layer has comparable (or even smaller) anisotropy but much larger intergranular exchange coupling. The thermal stability of the bilayer media is enhanced due to increased intergranular exchange coupling through the top layer.

In one example, the top layer has lower Curie temperature $T_{C2}$, and the write temperature is higher than $T_{C2}$, hence the intergranular exchange disappears together with magnetization of the top layer. The transition is defined by the switching in the bottom layer in response to the thermal/field gradient, and the transition is copied to the top layer after the media cools below $T_{C2}$.

If the top layer serves to stabilize the granular media during storage, the required thermal stability for the bottom layer is reduced to the time scale of the cooling of the top layer, ~1 ns. The stability factor R is:

$$R=ln(f_o t/ln(2))/(K_u V/kT).$$

If the stability factor must be a constant, then the grain volume can be decreased by about an order of magnitude for a given anisotropy $K_u$ as we scale from 10 years to 1 ns of required thermal stability time. This would allow currently available lower Curie temperature materials to scale to areal densities approaching 2 $Tb/in^2$.

Referring to FIG. 3, the magnetic layers could be fabricated using a Co/Pt multilayer structure produced via sputter deposition. Table 1 shows example parameters for one embodiment of the invention.

TABLE 1

| Property | Units | Bottom Layer | Top Layer |
| --- | --- | --- | --- |
| $T_C$ | K | 600 | 400-500 |
| $K_u$ | erg/cc | $4-8 \times 10^6$ | $2-4 \times 10^6$ |
| $H_k$ | kOe | 20-40 | 15-25 |
| $M_s$ | emu/cc | 400 | 300 |
| $H_{ex}$ | Normalized to $H_k$ | 0 | 0.2-0.5 |
| Thickness | nm | 5-15 | 5-15 |
| Grain size | nm | 3-8 | >10 nm |

While Table 1 shows parameters for a specific Co/Pt material, other materials would have different parameters. Because of the relatively thick top layer, the granular higher anisotropy bottom layer can be better protected from corrosion. This may allow additional magnetic materials to be considered.

Figure 8:
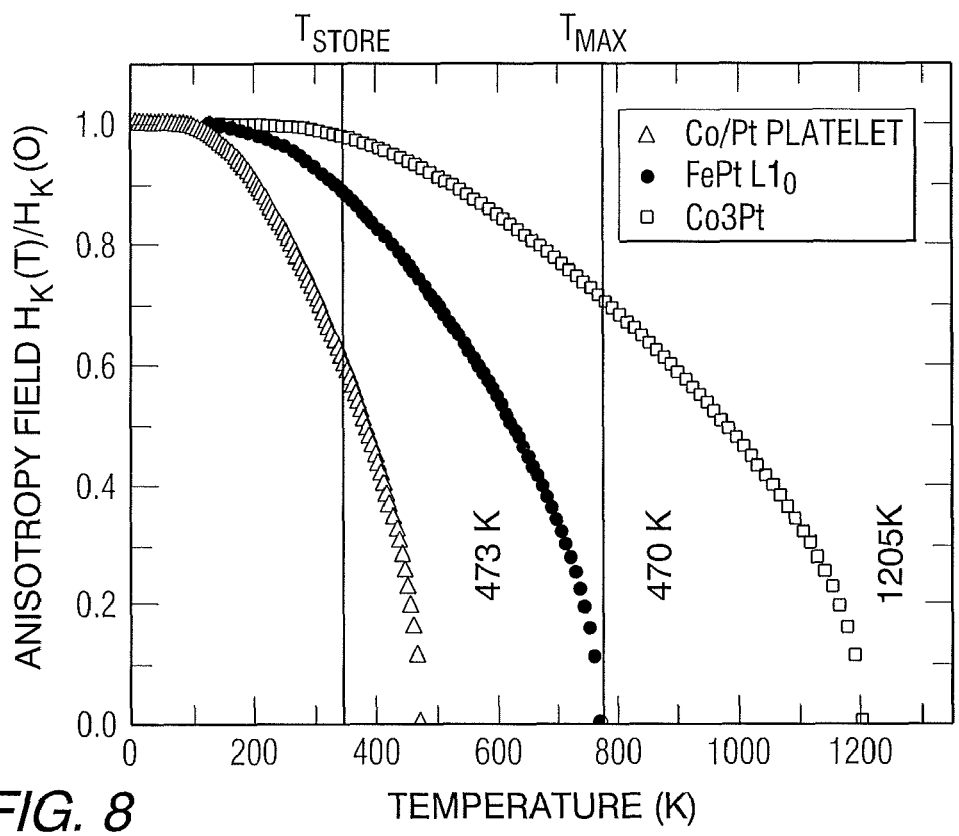
FIGS. 8 and 9 are graphs of relative anisotrophy versus temperature.
Figure 9:
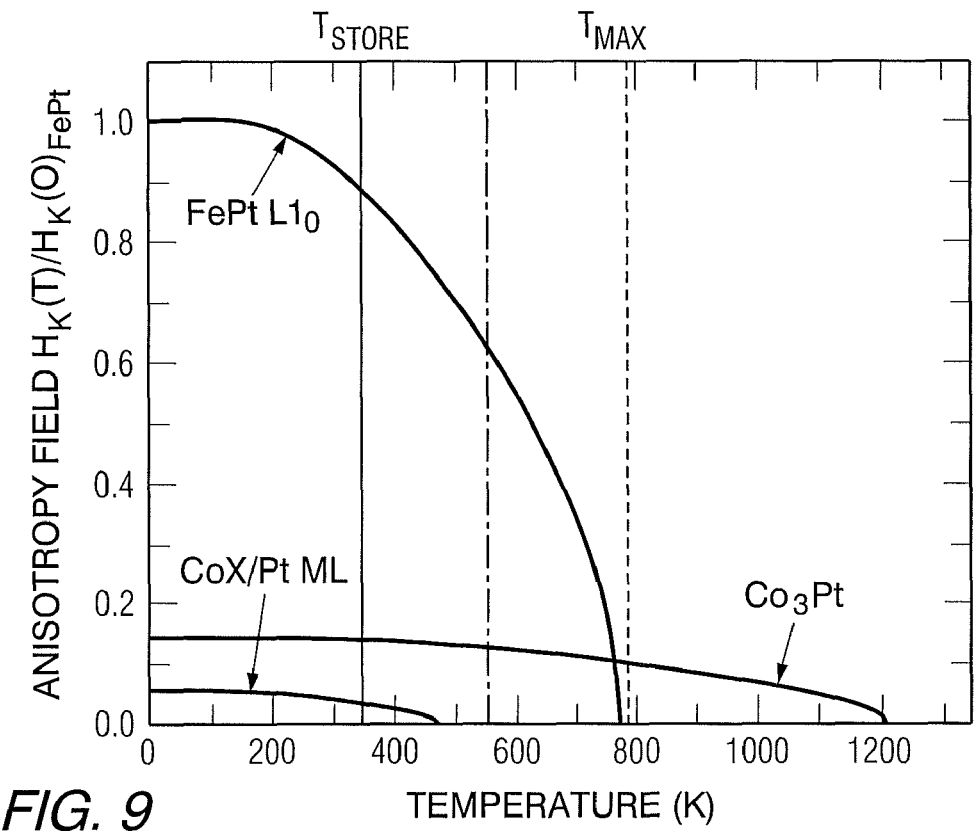

In FIGS. 8 and 9, the relative media anisotropy and its temperature dependence for three types of media are illustrated. FePt has the highest anisotropy (that can be as high as $7 \times 10^7$ erg/cc), and tunable $T_C$ (350-500° C.), but the microstructure is very difficult to control due to the typically required thermal annealing process needed to induce $L_{10}$ ordering. CoPt oxide media has a modest anisotropy ($1 \times 10^7$ erg/cc), and very nice microstructure with well isolated grain boundaries, however, the $T_C$ is too high (>1000° C.) for the design of a HAMR head disc interface (HDI). Co/Pt multilayer has a lower $T_C$ (200-400° C.), but the anisotropy usually drops low ($2-4 \times 10^6$ erg/cc) when attempting to achieve good microstructure, which might be insufficient to support high areal density. FIGS. 8 and 9 show the trade-off between Curie temperature and anisotropy, and the difficulty with a single layer design.

Figure 10:
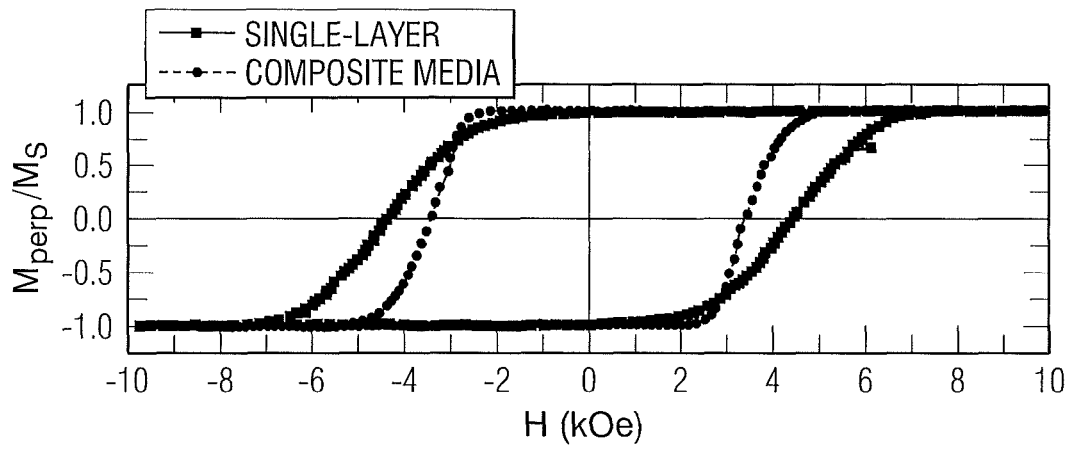
FIG. 10 is a graph of magnetization versus applied magnetic field.
Figure 11:
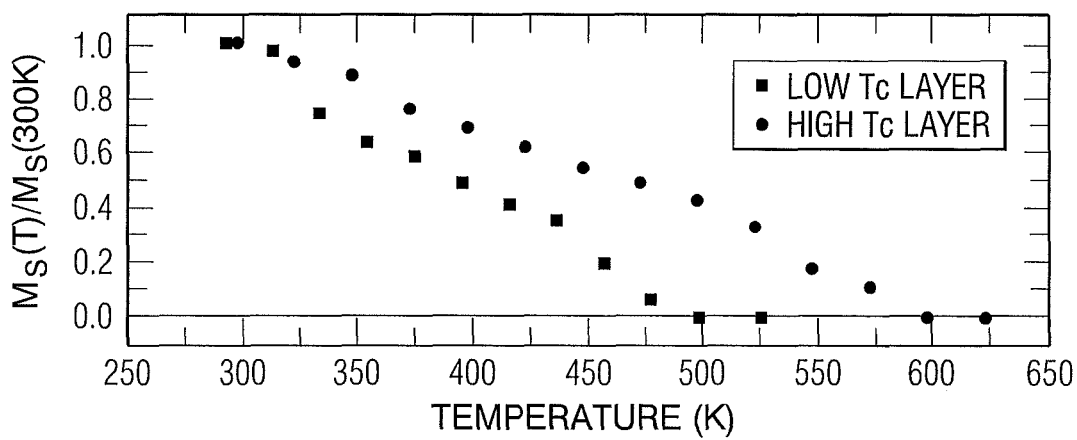
FIG. 11 is a graph of magnetization versus temperature.

In one example of the invention, the top layer has a $T_C$ of ~500 K, and the bottom layer has a $T_C$~600 K, while the top layer has much larger exchange coupling due to much less dopant of nonmagnetic materials. FIG. 10 shows a hysteresis loop for a single layer and a composite layer. The composite layer includes two layers with different $T_C$ temperatures as shown in the temperature dependent magnetization curves of FIG. 11. One can clearly see that such composite has much larger intergranular exchange coupling judging from the loop slope, which enhances thermal stability at room temperature (RT), while the coupling can be turned off at the write temperature due to the low $T_C$ of the top layer.

Figure 12:
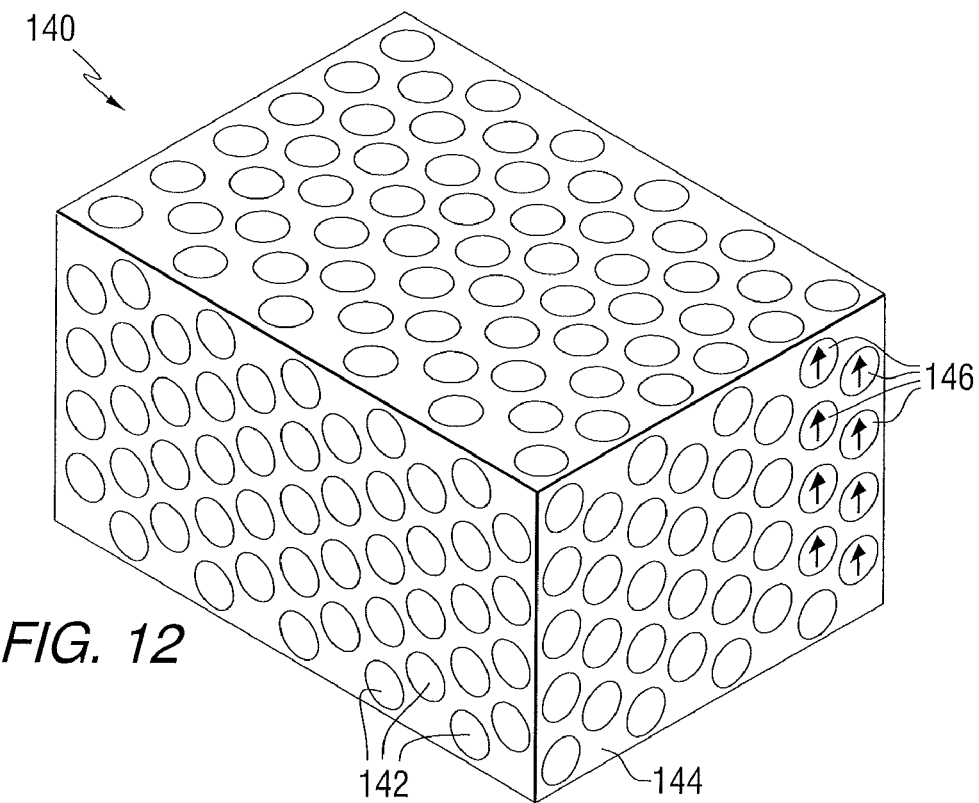
FIG. 12 is a schematic representation of a recording film in accordance with another embodiment of the invention.

In another aspect, the invention provides a storage medium in which a high $T_C$ material is encapsulated in a low $T_C$ material in a matrix. FIG. 12 is a schematic representation of a recording film 140 in accordance with an embodiment of the invention. The film includes a plurality of grains 142 of a first magnetic material embedded in a matrix of a second magnetic material 144. The directions of magnetization 146 can be controlled by heating the medium and applying a magnetic field to the heated portion of the medium.

The first magnetic material can be a conventional metallic recording alloy, e.g. $Co_3Pt$ or CoXPt alloy, with a Curie temperature higher than the intended HAMR recording temperature (e.g. >1000 K). The second magnetic material can have a poor thermal conductivity and a low Curie temperature, compatible with the intended HAMR recording temperature.

The second material is a magnetic oxide, which acts to couple neighboring grains at storage temperatures, but has a Curie temperature below or near the freezing (writing) temperature. Recording occurs under conditions of no (or weak) exchange coupling through the matrix material, and storage involves large exchange coupling through the matrix material. The use of a magnetic oxide matrix material provides a clean boundary between the grains of the first magnetic material.

Once magnetic transitions have been recorded, they are assumed to stay where they are, even in the presence of stray fields from neighboring bits. It is noted that the metallic granular alloy is not required to have significantly higher magnetic anisotropy (coercivity) than conventional perpendicular magnetic recording media, i.e. this medium is almost writable without applying heat. The heating is mainly used to (a) confine the region, which gets recorded and (b) to generate a sharp total field gradient $dH_{tot}/dx = dH_k/dT \times dT/dx$.

In one embodiment, FePtNi or CoPt grains are surrounded by a $Fe_3O_4$ matrix with packing density of about 60%. The oxide has a lower $H_k$ and Curie temperature than the FePtNi or CoPt. Heating above the Curie temperature of the matrix removes (or lowers) the exchange coupling through the matrix material. The grains will be magnetically blocked during cooling. The matrix provides thermal stability of the magnetization via exchange coupling through the matrix material after further cooling through the matrix material Curie temperature $T_{C,matrix}$. The matrix material contributes to the total magnetization of the frozen state resulting in improvement of the effective packing density and read signal.

Figure 13:
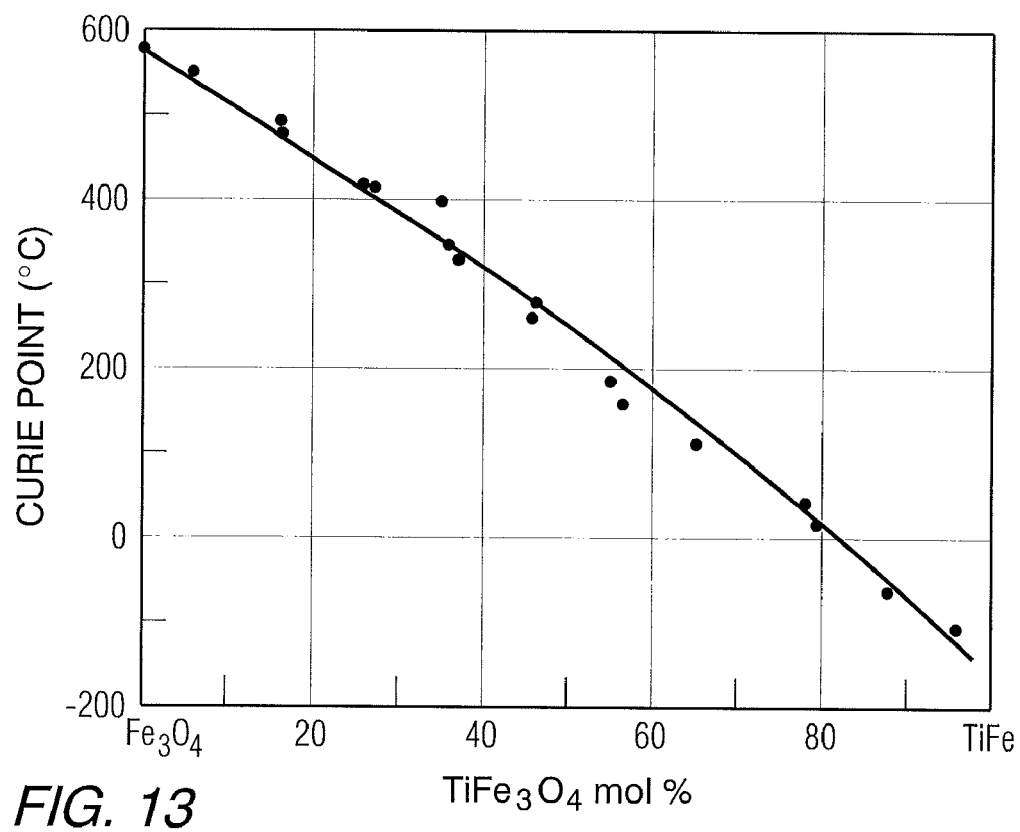
FIG. 13 is a graph of Curie temperature versus Ti content for a $TiFe_3O_4$ material.

A possible material for the matrix is magnetite ($Fe_3O_4$) or another iron oxide. The Curie temperature of magnetite is 575-585 C with a moment density of 0.56 T. As a boundary oxide matrix, $T_{C,matrix}$ will likely be lower. Also, it is readily possible to adjust the Curie temperature of the matrix oxide by doping, e.g. with Ti as shown in FIG. 13, indicating that doping with Ti can be used to adjust $T_{C,matrix}$ in the range 585 to about -150 C. FIG. 13 is a graph of Curie temperature versus Ti content for an $Fe_3O_4$ material.

Bulk properties of various known oxides, as well as magnetic sulfides, are listed in Tables 2 and 3, The choice of magnetic matrix materials is not limited to oxides. In essence, any heterogeneous, multi-component system, where the matrix has a lower $T_C$ than the "storage" material may work. For example, non-oxide magnetic materials such as nitrides, borides, or sulfides can be used. The main difference between the matrix structure and the high $T_C$/low $T_C$ dual layer approach is that after cooling, neighboring grains in each layer will be exchange coupled.

Table 2 shows the bulk properties of several oxides and sulfides, with $T_C$>RT.

TABLE 2

| Material | $E_g$ (eV) | Doping | Moment ($\mu_B$) | $T_C$ (K) |
|---|---|---|---|---|
| GaN | 3.5 | Mn - 9% | 0.9 | 940 |
| | | Cr | — | >400 |
| AlN | 4.3 | Cr - 7% | 1.2 | >600 |
| $TiO_2$ | 3.2 | V - 5% | 4.2 | >400 |
| | | Co - 1-2% | 0.3 | >300 |
| | | Co - 7% | 1.4 | ≈650 |
| | | Fe - 2% | 2.4 | >300 |
| $SnO_2$ | 3.5 | Fe - 5% | 1.8 | 610 |
| | | Co - 5% | 7.5 | 650 |
| ZnO | 3.3 | V - 15% | 0.5 | >350 |
| | | Mn - 2.2% | 0.16 | >300 |
| | | Fe - 5%, Cu - 1% | 0.75 | 550 |
| | | Co - 10% | 2.0 | 280-300 |
| | | Ni - 0.9% | 0.06 | >300 |
| $Cu_2O$ | 2.0 | Co - 5%, Al - 0.5% | 0.2 | >300 |

Table 3 shows ferrimagnetic oxides and sulfides with $T_C$ larger than room temperature.

TABLE 3

| Mineral | Composition | Magnetic Order | $T_C$ (° C.) | $\sigma_s$ ($Am^2$/kg) |
|---|---|---|---|---|
| Oxides | | | | |
| Magnetite | $Fe_3O_4$ | ferrimagnetic | 575-585 | 90-92 |
| Ulvospinel | $Fe_2TiO_2$ | AFM | −153 | |
| Hematite | $\alpha Fe_2O_3$ | canted AFM | 675 | 0.4 |
| Ilmenite | $FeTiO_2$ | AFM | −233 | |
| Maghemite | $\gamma Fe_2O_3$ | ferrimagnetic | ~600 | ~80 |
| Jacobsite | $MNFe_2O_4$ | ferrimagnetic | 300 | 77 |
| Trevorite | $NiFe_2O_4$ | ferrimagnetic | 585 | 51 |
| Magnesioferrite | $MgFe_2O_4$ | ferrimagnetic | 440 | 21 |
| Sulfides | | | | |
| Pyrrhotite | $Fe_7S_8$ | ferrimagnetic | 320 | ~20 |
| Greigite | $Fe_3S_4$ | ferrimagnetic | ~333 | ~25 |
| Troilite | FeS | AFM | 305 | |
| Oxyhydroxides | | | | |
| Goethite | $\alpha FeOOH$ | AFM, weak FM | ~120 | <1 |
| Lepidocrocite | $\gamma FeOOH$ | AFM(?) | −196 | |
| Feroxyhyte | $\delta FeOOH$ | ferrimagnetic | ~180 | <10 |

The media of this invention use temperature to turn the intergranular exchange coupling on and off, which increases thermal stability at storage temperatures, and extends the recording density capability of certain media.

The invention includes at least two different functional (magnetic) components. By using temperature to turn the exchange coupling between grains on and off, thermal stability can be achieved with good writability for smaller grains by producing a high exchange during storage and a low exchange during the data recording process.

Figure 14:
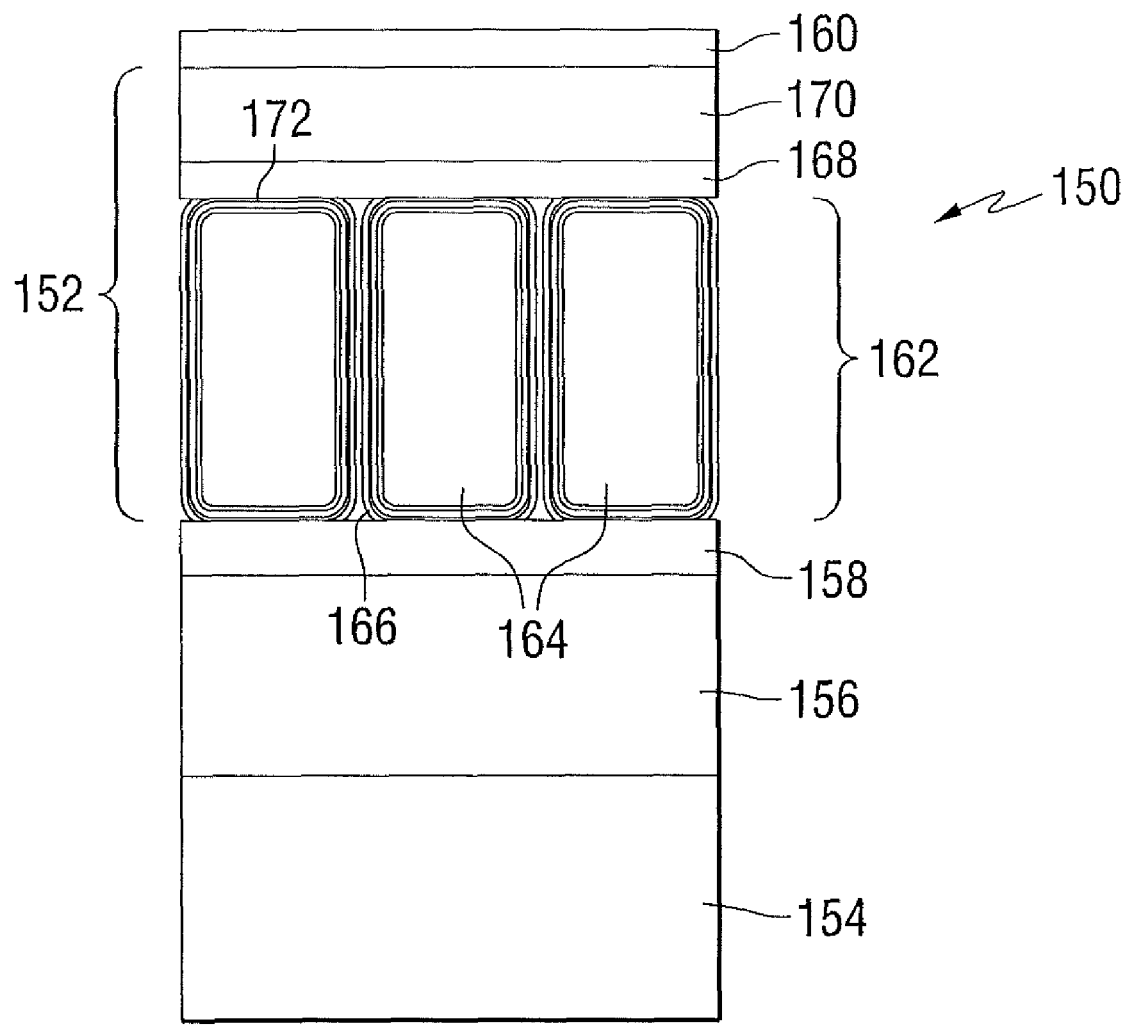
FIG. 14 is a schematic sectional view of a recording medium including another magnetic recording film in accordance with the invention.

The concept is extendable to other architectures and other materials. For example, CoCr or a similar low $T_C$ metal interleaved (on top, under or in between) with conventional granular oxide media could be used. FIG. 14 shows an alternative example of a heat assisted magnetic recording medium 150 that includes a composite magnetic recording film 152 constructed in accordance with one embodiment of the present invention. The recording medium 150 in this example includes a substrate 154, a heat sink layer 156 that may serve as a soft magnetic underlayer, and a seed layer 158 on the heat sink layer.

The substrate 154 may be made of any suitable material such as ceramic glass, amorphous glass, aluminum or NiP coated AlMg. The heat sink layer has a typical thickness of from about 10 to about 1,000 nm, and may be made of any suitable material such as Cu, Ag, Al, Au, CuZr, CoFe, FeCoB, FeAlN, FeAlSi, NiFe, CoZrNb or FeTaN. The heat sink layer 156 may also comprise laminated structures. A protective and/or lubricating layer 160 can be provided on the recording layer.

The composite magnetic recording film includes a first (or bottom) layer 162, which in this example is a granular layer having magnetic grains 164, that are separated by a decoupling material 166, which can be an oxide. The composite magnetic recording film further includes a second (or top) layer 170, that is a substantially continuous layer having magnetic grains that are larger than the grains of the first layer.

An optional exchange coupling control layer 168 may be provided between the first and second layers. The thickness of the optional exchange coupling control layer 170 can be changed to control the amount of exchange coupling between the first and second layers.

While the invention has been described in terms of several examples, it will be apparent to those skilled in the art that various changes can be made to the disclosed examples, without departing from the scope of the invention as set forth in the following claims.

What is claimed is:

1. A thin film structure comprising:
a plurality of grains of a first magnetic material comprising FePtNi or CoPt and having a first Curie temperature embedded in a matrix of a second material having a second Curie temperature, wherein the second Curie temperature is lower than the first Curie temperature and the second material comprises one or more of an oxide, a sulfide, a nitride, and a boride, and wherein the packing density of the first magnetic material is about 60%.

2. The thin film structure of claim 1, wherein the matrix includes a doping material.

3. The thin film structure of claim 2, wherein the doping material comprises one or more of: Mn, Cr, V, Co, Fe, Cu, Ni, Ti and Al.

4. A thin film structure comprising:
a plurality of grains of a first magnetic material having a first Curie temperature embedded in a matrix of a second material having a second Curie temperature, wherein the second Curie temperature is lower than the first Curie temperature and the second material comprises one or more of an oxide, a sulfide, a nitride, and a boride, and wherein the second material comprises $Fe_3O_4$, and the matrix is doped with a doping material comprising titanium.

5. The thin film structure of claim 4, wherein the second material has a Curie temperature in a range of from about 150° C. to 585° C.

6. The thin film structure of claim 1, wherein the second material comprises a magnetic oxide.

7. A thin film structure comprising:
a plurality of grains of a first magnetic material having a first Curie temperature embedded in a matrix of a second material having a second Curie temperature, wherein the second Curie temperature is lower than the first Curie temperature and the second material comprises one or more of an oxide, a sulfide, a nitride, and a boride, the first magnetic material has a Curie temperature greater than 1000° K, and the second material has a Curie temperature in a range of from 575° C. to 585° C. and a moment density of 0.56 T.

8. A data storage system comprising:
a transducer;
a storage medium including a plurality of grains of a first magnetic material comprising FePtNi or CoPt and having a first Curie temperature embedded in a matrix of a second material having a second Curie temperature, wherein the second Curie temperature is lower than the first Curie temperature and the second magnetic material comprises one or more of an oxide, a sulfide, a nitride, and a boride, and wherein the packing density of the first magnetic material is about 60%; and
an actuator for causing relative movement between the transducer and the storage medium.

9. The data storage system of claim 8, wherein the matrix includes a doping material.

10. The data storage system of claim 9, wherein the doping material comprises one or more of: Mn, Cr, V, Co, Fe, Cu, Ni, Ti and Al.

11. The data storage system of claim 8, wherein the second material comprises a magnetic oxide.

12. A data storage system comprising:
a transducer;
a storage medium including a plurality of grains of a first magnetic material having a first Curie temperature embedded in a matrix of a second material having a second Curie temperature, wherein the second Curie temperature is lower than the first Curie temperature and the second magnetic material comprises one or more of an oxide, a sulfide, a nitride, and a boride; and wherein the second material comprises $Fe_3O_4$, and the matrix is doped with a doping material comprising titanium; and
an actuator for causing relative movement between the transducer and the storage medium.

13. The data storage system of claim 12, wherein the second material has a Curie temperature in a range of from about 150° C. to 585° C.

14. A data storage system comprising:
a transducer;
a storage medium including a plurality of grains of a first magnetic material having a first Curie temperature embedded in a matrix of a second material having a second Curie temperature, wherein the second Curie temperature is lower than the first Curie temperature and the second magnetic material comprises one or more of an oxide, a sulfide, a nitride, and a boride, the first magnetic material has a Curie temperature greater than 1000° K, and the second material has a Curie temperature in a range of from 575° C. to 585° C., and a moment density of 0.56 T; and
an actuator for causing relative movement between the transducer and the storage medium.

* * * * *